US011795667B1

(12) United States Patent
Dorn

(10) Patent No.: US 11,795,667 B1
(45) Date of Patent: Oct. 24, 2023

(54) PORTABLE, SELF-CONTAINED LIQUID STORAGE TRANSPORT SYSTEM AND DEVICE

(71) Applicant: Walt Dorn, Simi Valley, CA (US)

(72) Inventor: Walt Dorn, Simi Valley, CA (US)

( * ) Notice: Subject to any disclaimer, the term of this patent is extended or adjusted under 35 U.S.C. 154(b) by 0 days.

(21) Appl. No.: 17/899,973

(22) Filed: Aug. 31, 2022

(51) Int. Cl.
*E03B 9/02* (2006.01)
*A62C 27/00* (2006.01)
*A62C 99/00* (2010.01)
*G09B 19/00* (2006.01)
*G09B 9/00* (2006.01)

(52) U.S. Cl.
CPC ............... *E03B 9/02* (2013.01); *A62C 27/00* (2013.01); *A62C 99/0081* (2013.01); *G09B 9/00* (2013.01); *G09B 19/00* (2013.01); *Y10T 137/6855* (2015.04)

(58) Field of Classification Search
CPC ....... A62C 27/00; A62C 99/0081; E03B 9/02; G09B 9/00; G09B 19/00; Y10T 137/6855
USPC .............................................. 434/226; 4/616
See application file for complete search history.

(56) References Cited

U.S. PATENT DOCUMENTS

| | | | | |
|---|---|---|---|---|
| 4,303,396 A * | 12/1981 | Swiatosz | ................... | G09B 9/00 434/226 |
| 4,526,548 A * | 7/1985 | Livingston | ............. | G09B 19/00 434/226 |
| 5,173,052 A * | 12/1992 | Duncan, Jr. | ............ | G09B 19/00 296/168 |
| 5,181,851 A * | 1/1993 | Layton | ..................... | G09B 9/00 434/226 |
| 5,226,818 A * | 7/1993 | Feiock | ............... | A62C 99/0081 434/226 |

(Continued)

Primary Examiner — Kevin F Murphy
Assistant Examiner — Jonathan J. Waddy
(74) Attorney, Agent, or Firm — Sandy Lipkin

(57) ABSTRACT

A mobile water/fluid collection, recirculation management apparatus and system for the promotion of best and safest practices by firefighting engineers, candidates fire departments, agencies, colleges and academies as well as for the NFPA (National Pire Protection Agency) recommended annual testing of other apparatuses, pumps, and appliances, which allows for engineers and candidates to train and practice their requisite evolutions and drills using full-flow water/fluids at full and various pressures including, but not limited to, drafting, flowing hand lines, deck guns, ground monitors, aerials and ladder pipes, nozzles and appliances while returning the water/fluid to the apparatus via direct and indirect connections. All returning water/fluids encounter the diffuser screen that is internal and integral to the unit and/or via the roof target and associated diffuser. Included is a removable, portable training fire hydrant which allows for the engineers and candidates to get real world driver training including spotting the hydrant and the race for water training elements, requiring the engineer/candidate to stop in the right spot, hook up the correct hoses from their engine to the hydrant directly to the invention apparatus, to pump and flow water safely, accurately and efficiently, and, once filled with the requisite water/fluid, it is ready for continuous recirculation, training or testing evolutions without overheating the water/fluid, because it is continuously cooled passively with the diffusers in an open loop design.

5 Claims, 11 Drawing Sheets

(56) References Cited

U.S. PATENT DOCUMENTS

| | | | | |
|---|---|---|---|---|
| 5,927,990 A * | 7/1999 | Welch | ................... | G09B 19/00 |
| | | | | 434/226 |
| 8,048,505 B1 * | 11/2011 | Reaney | ................... | B32B 15/04 |
| | | | | 428/44 |
| 8,312,935 B1 * | 11/2012 | Cramton | ............ | A62C 99/0081 |
| | | | | 239/125 |
| 10,434,346 B1 * | 10/2019 | Weis | ....................... | G09B 19/24 |
| 2003/0121672 A1 * | 7/2003 | Spaniol | .............. | A62C 99/0081 |
| | | | | 169/5 |
| 2005/0233289 A1 * | 10/2005 | Hoglund | ................ | G09B 19/00 |
| | | | | 434/226 |
| 2006/0240392 A1 * | 10/2006 | Clifton | ............... | A62C 99/0081 |
| | | | | 434/226 |
| 2009/0188188 A1 * | 7/2009 | Rivet | ....................... | E04B 1/10 |
| | | | | 52/656.1 |
| 2010/0248196 A1 * | 9/2010 | Beishon | ................... | C06D 3/00 |
| | | | | 434/226 |
| 2019/0118016 A1 * | 4/2019 | Severijns | ............... | G09B 19/00 |
| 2021/0244988 A1 * | 8/2021 | Casanova | .......... | A62C 99/0081 |

\* cited by examiner

PORTABLE, SELF-CONTAINED LIQUID STORAGE TRANSPORT SYSTEM AND DEVICE

BACKGROUND OF THE INVENTION

Field of the Invention

The present invention relates generally to the field of fire engineer and candidate training on apparatuses and appliances and more particularly towards a mobile/portable training apparatus capable of also performing pump and appliance testing continuously without overheating or wasting the training fluid—medium—water.

Description of the Prior Art

Of increasing concern is the general concern and need to conserve water. Nevertheless, water is absolutely required to be used in the training of fire engineers and candidates. A typical single training evolution or pump test may require 60,000-100,000 gallons of water, which is historically lost, i.e., wasted during a training exercise or a pump test. A need exists for an apparatus and/or system to train fire engineers and candidates in their field in the art of extinguishing fires efficiently and with consideration of water conservation and recirculation along with the needs of the environment at large. This instant invention seeks to meet this need.

The constantly changing environment in which we live is exacerbating the need to provide the very best training for first responders while being good stewards of the environment. The need for their tools and training to evolve has never been greater. Traditionally, fire engineers and candidates have had a wide variety of options to access free, plentiful fresh water for their training needs, yet, conversely, fresh water is not "free" and it is of a finite and limited supply throughout much of the country and the world. As good stewards of the environment, fire agencies, colleges and training institutes are seeking ways to provide the very best training and pump appliance testing environments while remaining cognizant of the need for fiscal and environmental responsibility.

Fire engineers and candidates must flow water through their apparatuses and appliances in order to train safely and professionally. Also, fire apparatuses and appliances must be tested to their capacities each and every year to be sure they are in the best and safest working condition. The object of this instant invention is to meet those needs.

SUMMARY OF THE INVENTION

The basic embodiment of the present invention teaches a mobile system and apparatus for training of firefighter personnel that recirculates water/fluids for continuous use without overheating said water/fluids, said system and apparatus comprising: a mobile base that is attachable via a hitch to a larger vehicle for towing; a cistern situated on top of said mobile base for the collection, containment and recirculation of said water/fluids, said cistern further comprising: an outer wall; a roof; an interior space formed between said base, said outer wall and said roof into which said water/fluids are collected, contained and/or recirculated; and a target on said roof, said target being, from above and further comprising a plurality of apertures that allow for the diffusion of heat generated through the circulation of said water/fluids.

The above embodiment can be further modified by defining that a portable fire hydrant is attached to said mobile base, said portable fire hydrant being secured thereon with a pin.

The above embodiment can be further modified by defining that said interior space inside of said cistern is an angled planar diffuser element, said diffuser element containing a plurality of apertures that diffuses heat generated by said water/fluids.

The above embodiment can be further modified by defining that said cistern includes an openable door to said interior space wherein when said operable door is opened, a hanging target is revealed for the aiming of water/fluids thereon.

The above embodiment can be further modified by defining that inside of said interior space of said cistern is an automatic shut off valve that shuts off when a specific water/fluid level is reached inside of said interior space of said cistern.

The above embodiment can be further modified by defining that inside of said interior space of said cistern is a resistance coil and a pressure relief valve.

The above embodiment can be further modified by defining that a drafting riser assembly is affixed to said mobile base, said drafting riser assembly further comprising: a pipe with a diameter of six inches and a lift that is six feet into which a hard suction is installed via connection with a fire engine apparatus.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
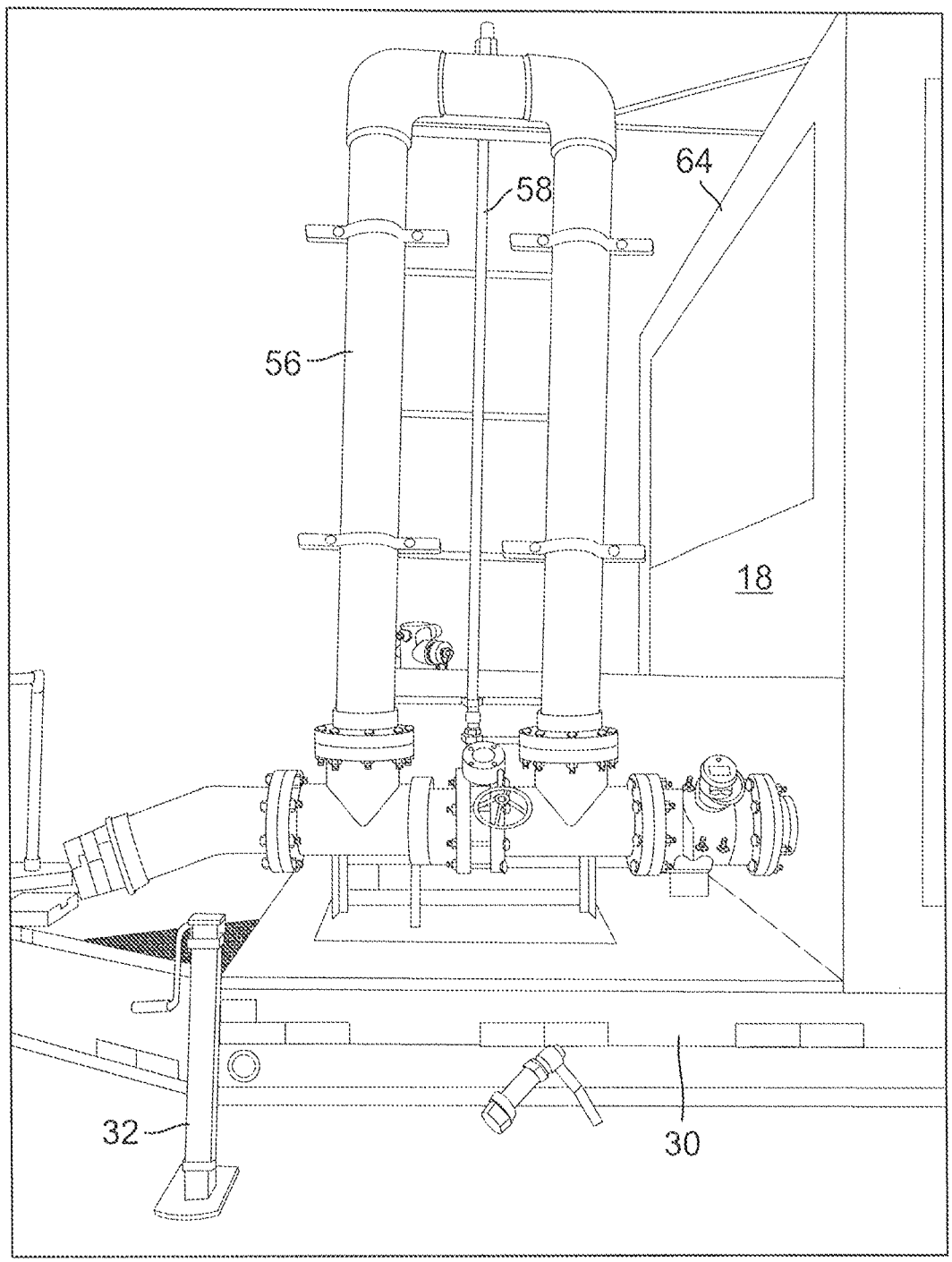
FIG. 1 is a side perspective view of a portion of the apparatus and system of the instant invention.
Figure 2:
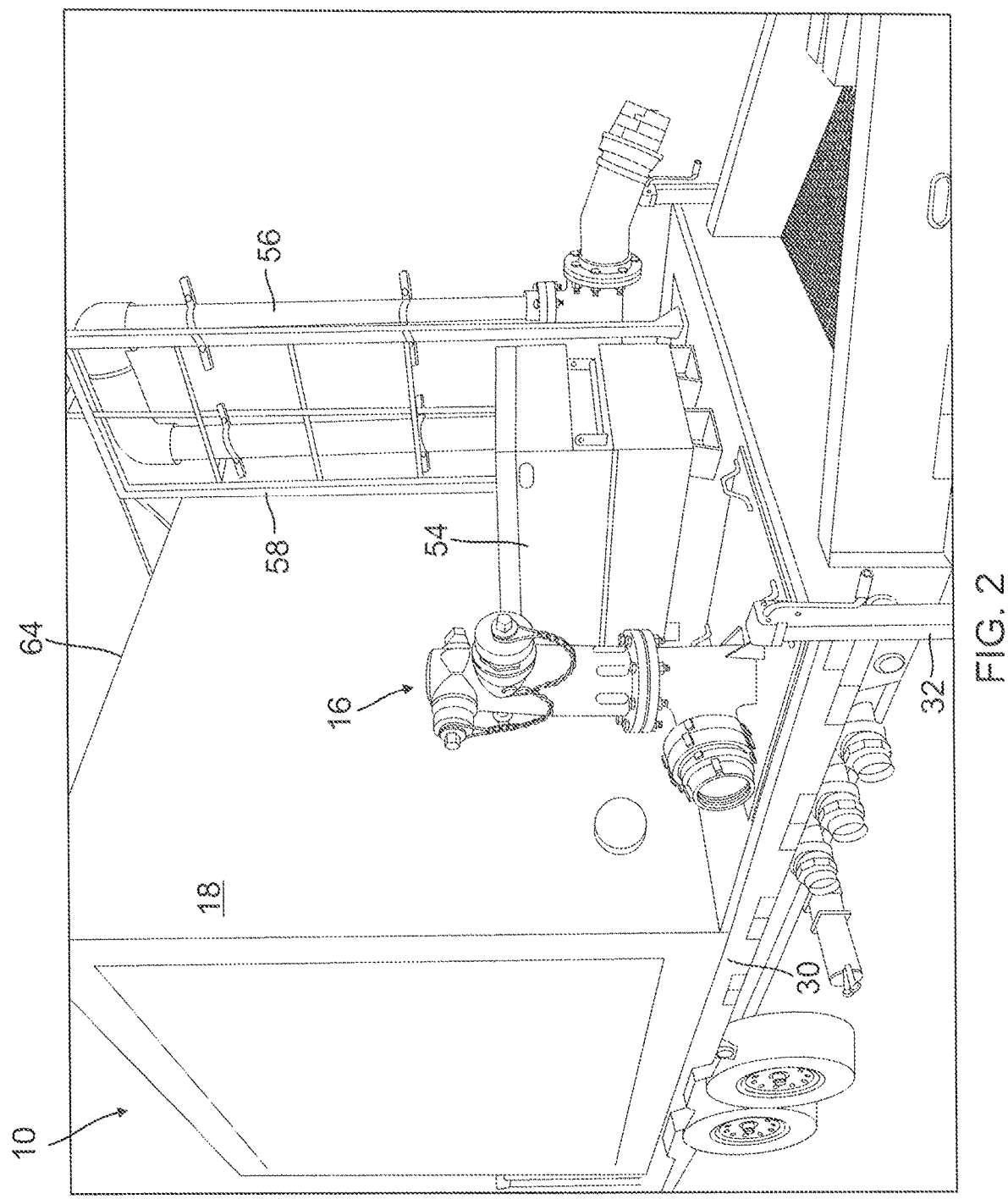
FIG. 2 is a front, side perspective of the apparatus and system of the instant invention.
Figure 3:
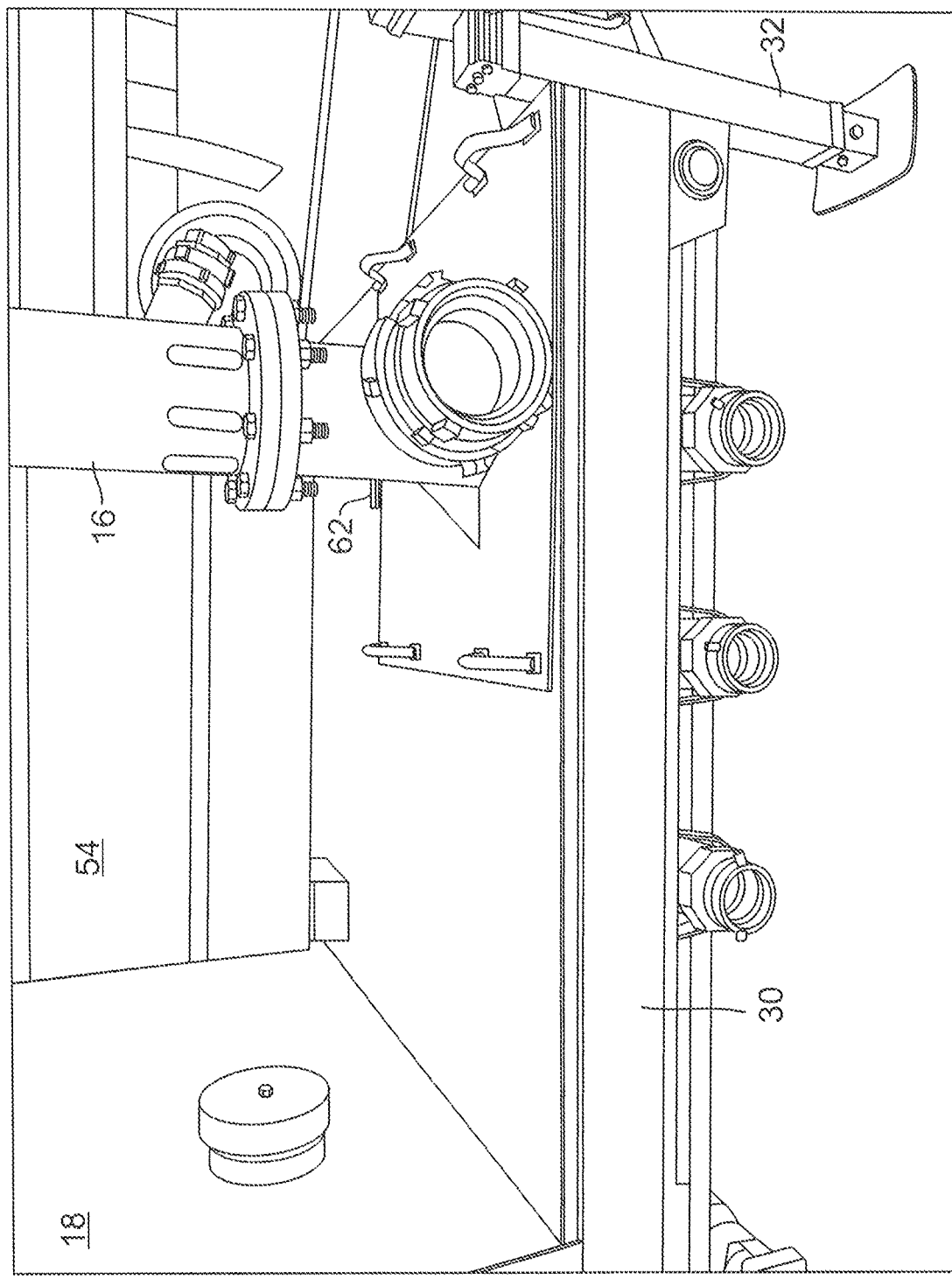
FIG. 3 is a close-up of the fire department connection ("FDC") in the area adjacent to the storage locker and portable hydrant home location on the apparatus of the instant invention.
Figure 4:
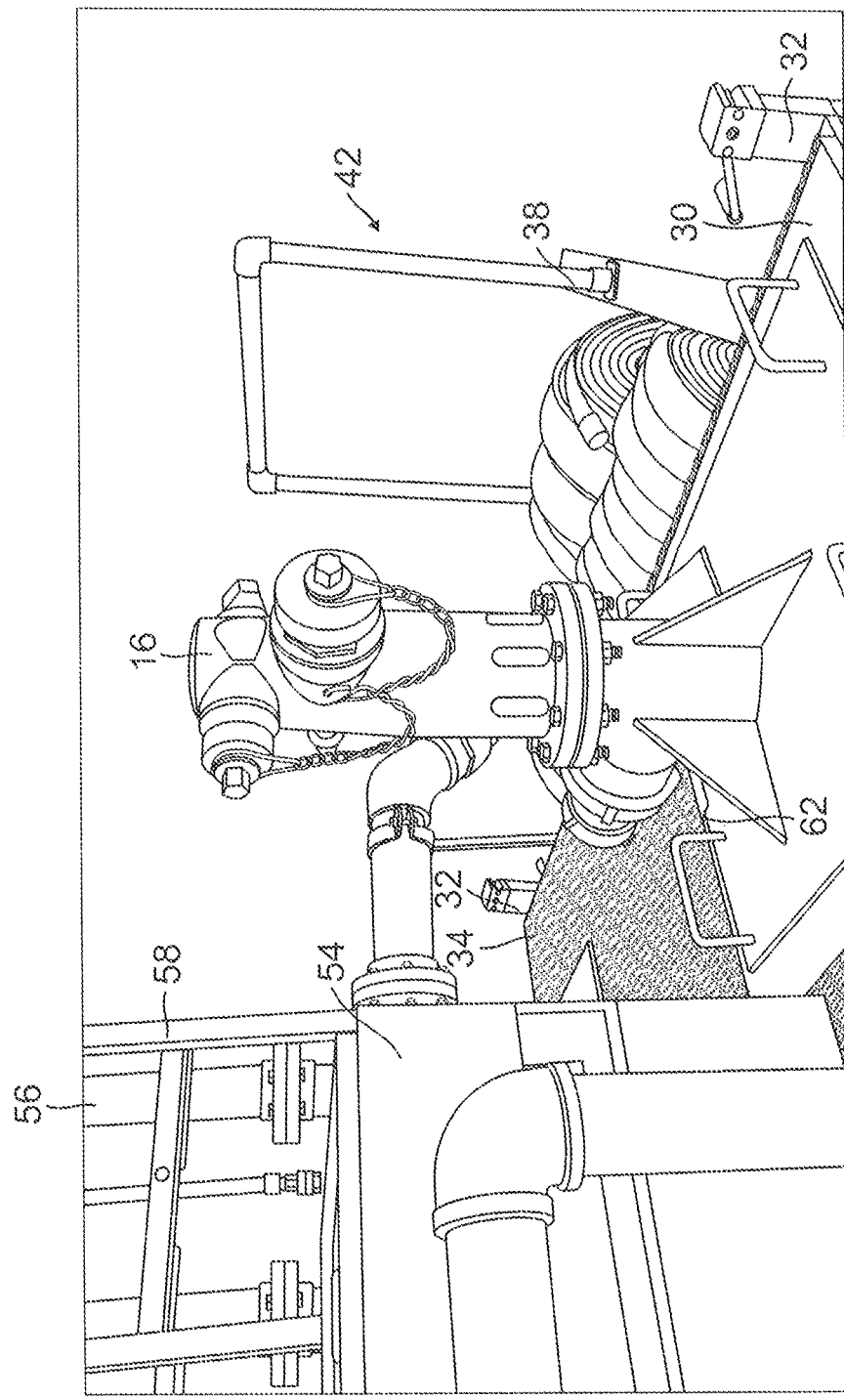
FIG. 4 is a close-up view of the front portion of the apparatus of the instant invention where the portable hydrant is nested and secured thereon in its home location.
Figure 5:
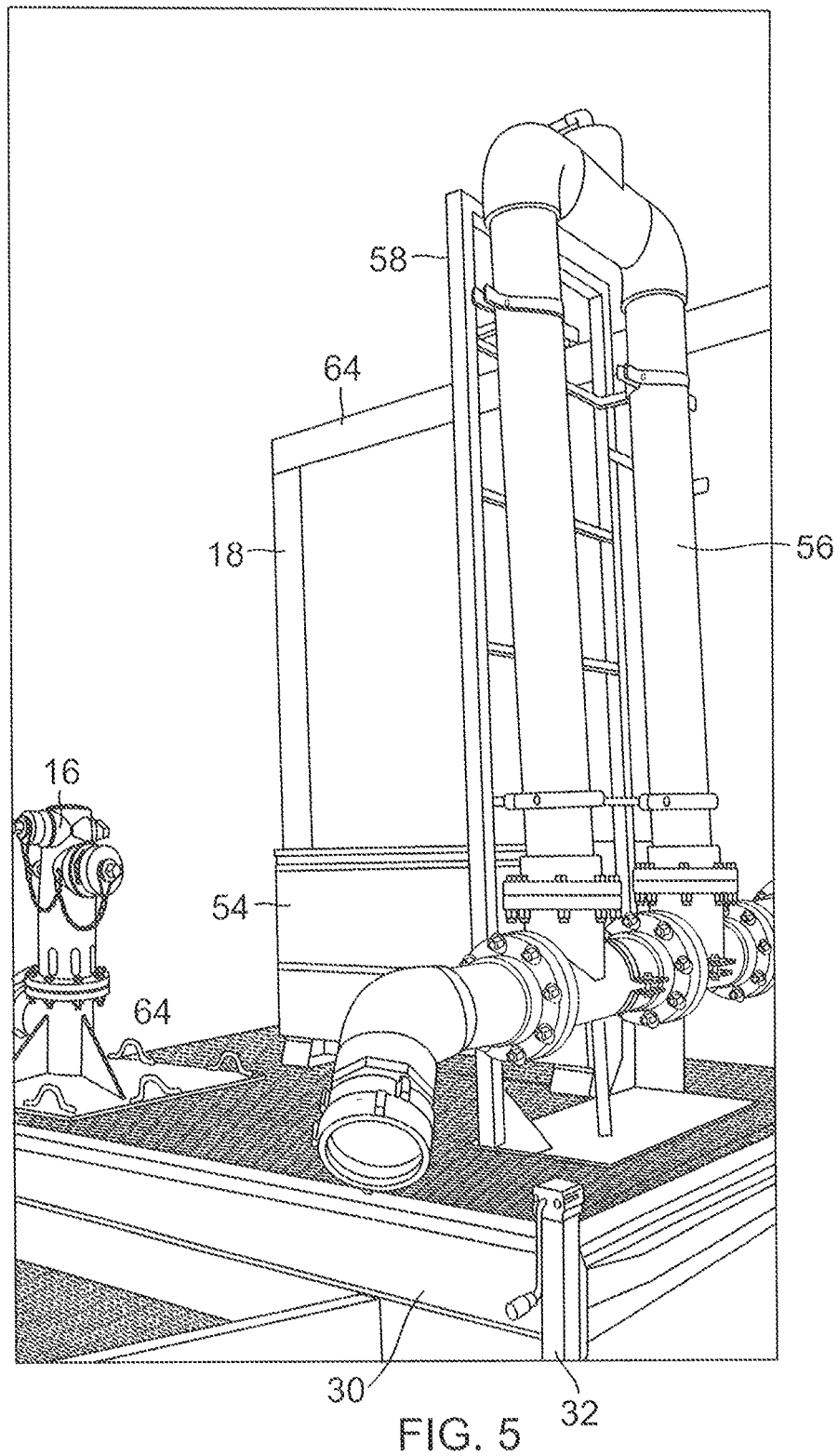
FIG. 5 is a side perspective view similar to FIG. 1 of the apparatus of the instant invention.

Turning to the drawings, the preferred embodiment is illustrated and described by reference characters that denote similar elements throughout the several views of the instant invention.

In the preferred embodiment, the instant invention provides for a mobile fluid collection and recirculation apparatus 10 for the promotion of best and safest practices by firefighting engineers/candidates for the National Fire Protection Association (NFPA) and apparatus and appliance maintenance departments for their requisite annual testing requirements. The apparatus 10 allows for lire engineers/candidates to train and practice their professional requirements using full flow/real life pressures to all their handlines, ladder pipes, aerials, monitors, deck guns, ground assault monitors, nozzles and appliances whilst returning the fluid to the apparatus via direct and indirect connection to the apparatus. All returning fluids impact the diffuser screens and or the roof target diffusers 12, 14 which are integral to the apparatus 10. Also included is the portable training hydrant 16, which allows for the engineers/candidates to perform real driver training that allows for the actual "spotting of the hydrant" and perform full flow operations, while simultaneously allowing the trainers the capacity to modify the training environment that is historically a static environment. The on-board water/fluid medium is supplied by and returned to the apparatus 10 cistern 18 via the diffuser targets 12,14 which are engineered to support the returning fluids to be cooled passively whereby the operations can be continuous verses prior art "closed loop" configurations that fail operationally due to their propensity to overheat the water/fluid, which limits operations and promotes water/fluid waste.

The apparatus of the instant invention allows for engineers/candidates and pump testers to flow fluids at full flow rates whilst recovering, cooling and recirculating the water/fluids for immediate use.

Per government mandate in some states, fire departments have been forced to cut back on some training elements and in some cases stopping outright full flow training evolutions as well as reduced or postponed required testing and maintenance on certain apparatus and appliances. These typically include the highest flow in gallons per minute ("GPM") apparatus and appliances like the ladder pipes, aerial monitors deck guns and ground assault monitors. The apparatus 10 of the instant invention allows for the continuous full flow of these apparatuses and appliances with the integral components, specifically, the diffuser screens 12, the roof target diffuser 14, that break up the water/fluid streams and promote the highly efficient passive cooling that keeps the water/fluids at low temperatures so as to minimize the likelihood of an detrimental effects caused by excess heat in the water/fluids and/or postponement of the training evolutions or the apparatus/appliance testing. The diffuser screen 12 also incorporates a swinging target system that is employed during a wide variety of hand-line training evolutions for firefighters.

Figure 11:
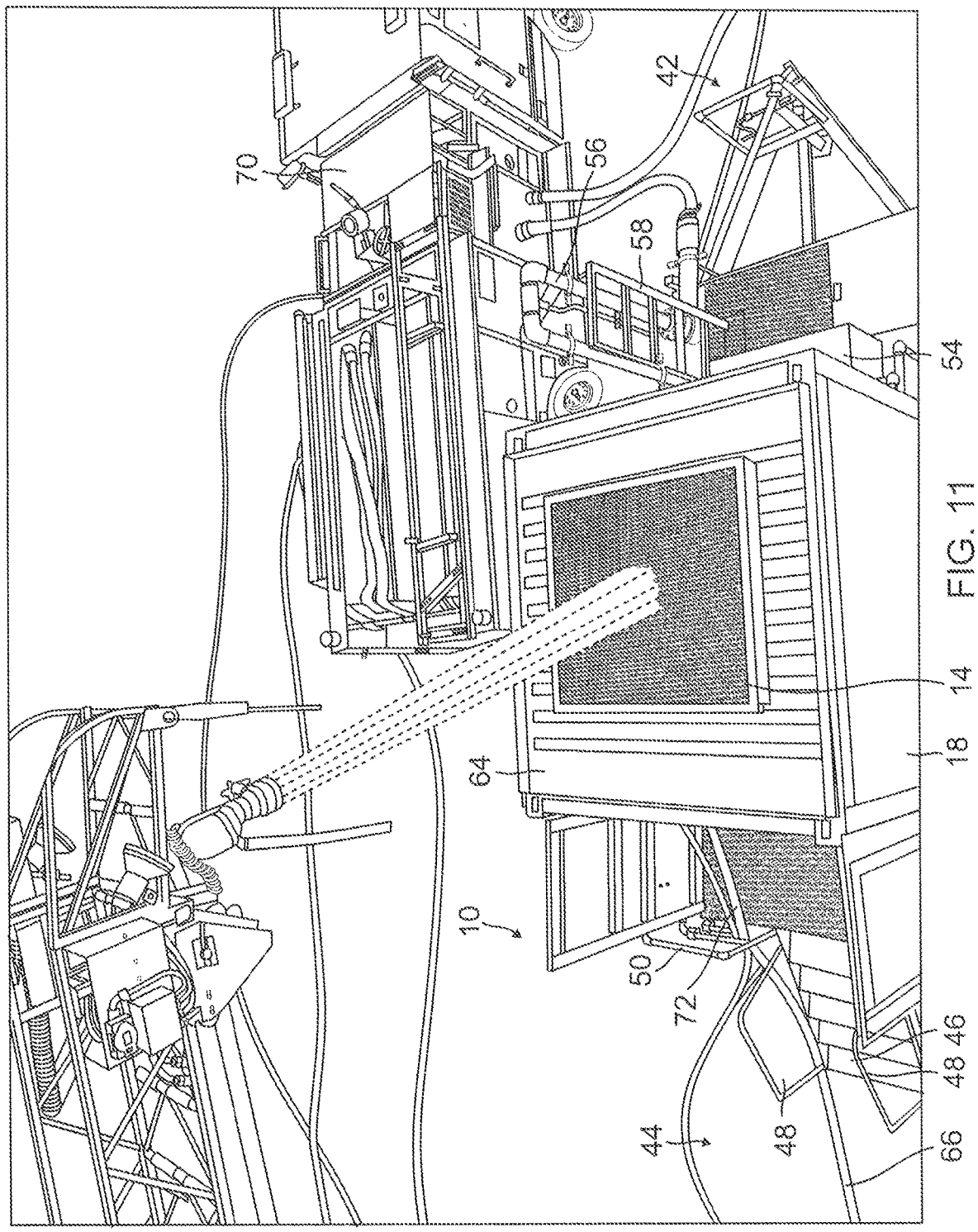
FIG. 11 is a top view of the apparatus showing the fire engineer/candidate training and apparatus testing element of the roof target receiver element of the apparatus of the instant invention.

In addition to the diffuser screens 12 inside the apparatus 10, the apparatus of the instant invention also includes a roof target diffuser 14, which meets the NFPA requirement for aerial and ladder pipe practice and testing with the target size of 5' in diameter. (See FIG. 11.) The roof target 14 also employs the diffuser screen technology promoting the passive cooling for the water/fluids in addition to the internal main diffuser 12 inside the apparatus.

The apparatus of the instant invention includes a roof target 14 which allows ladder trucks and aerials to shoot water/fluid down into the target 14 on the roof 64 of the apparatus which is positioned above the internal diffuser screen 12 and the cistern 18. (See FIG. 11.) The water/fluid sent to the 5'×5' roof target 14 allows the apparatus 10 to collect, cool and recirculate water/fluid which allows for the NFPA requisite of training and testing to hit the 5'×5' target from up to 102' away. Typically, these full flow evolutions require the use of up to 2,500 gallons per minute to be flowed which can be directed into the roof target 14 which incorporates the same diffuser technology present in the internal diffuser screen 12 as defined above. With this process the water/fluid is collected and cooled prior to entry into the cistern 18 where the water/fluid is immediately recirculated for continuous operations, training or testing.

A specific hanging target 20 also hangs from the diffuser 12 over the cistern 18 that firefighters can utilize for a wide variety of hand line training, practice evolutions and testing needs.

Per the NFPA, fire engineers, firefighters as well as their apparatus and appliances must be trained on and tested annually. With the ever-increasing restrictions being placed on water use in the country, it is imperative that the evolution of training apparatus is now forefront with water conservation in mind while making it possible for there not to be a drop in the quantity and the quality of training and testing available to the first responder community. The apparatus 10 of the instant invention can help alleviate these problems by making it not only easier, but possible at all, for firefighters, engineers, candidates and maintenance personnel to meet their requisite training and testing requirements without sacrificing the time or quantity of training/testing evolutions. This innovation includes environments considered too harsh for training and testing where it is too cold for extended periods of time, making it possible to place the apparatus 10 of the instant invention inside a warehouse or an aircraft hangar. As a portable unit, the apparatus 10 can be utilized year-round regardless of the weather outside. The NFPA guidelines and requirements for apparatuses and appliances are such that they all need to be practiced and tested to their nameplate stated capacities annually, which includes the fire pumps, nozzles and appliances at full-flow rates and varied pounds per square inch pressures for specified intervals. The apparatus 10 of the instant invention can make it a simple test because, as a mobile platform, the apparatus 10 can go out to the actual fire stations rather than requiring the fire apparatus to travel, out of service, to a designated location.

The removable portable training hydrant 16 on the apparatus 10 of the instant invention, allows for the most realistic training experience while allowing for full-flow for personnel and apparatus and appliance testing. The hydrant 16 is not affixed to the apparatus 10 nor is it constrained by a small on-board pump with limited flow capabilities. Rather, the hydrant 16 can be removed from its secure home base location on the apparatus 10 and placed anywhere the trainers and testing personnel want it to be, remote from the unit 10. The removable/portable fire hydrant 16 is stored on its home base on the front end of 42 adjacent to the storage locker 54 and is kept in its home base by the securing pin 62. (See FIGS. 2, 4, 5, 10.)

Figure 8:
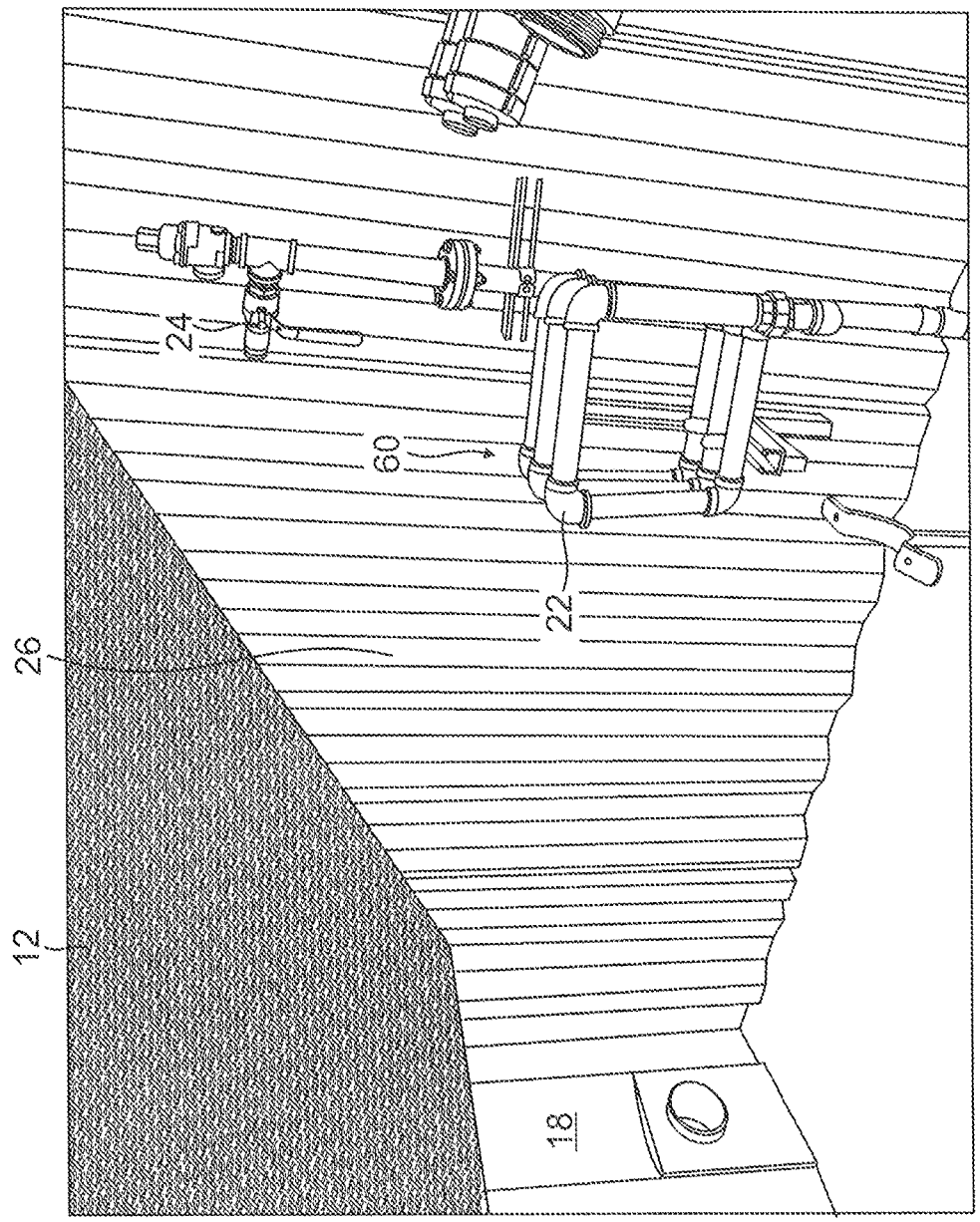
FIG. 8 is a view inside the cistern portion of the apparatus of the instant invention showing the fire sprinkler/stand pipe system along with the fluid friction coil that generates resistance for the fluid.
Figure 9:
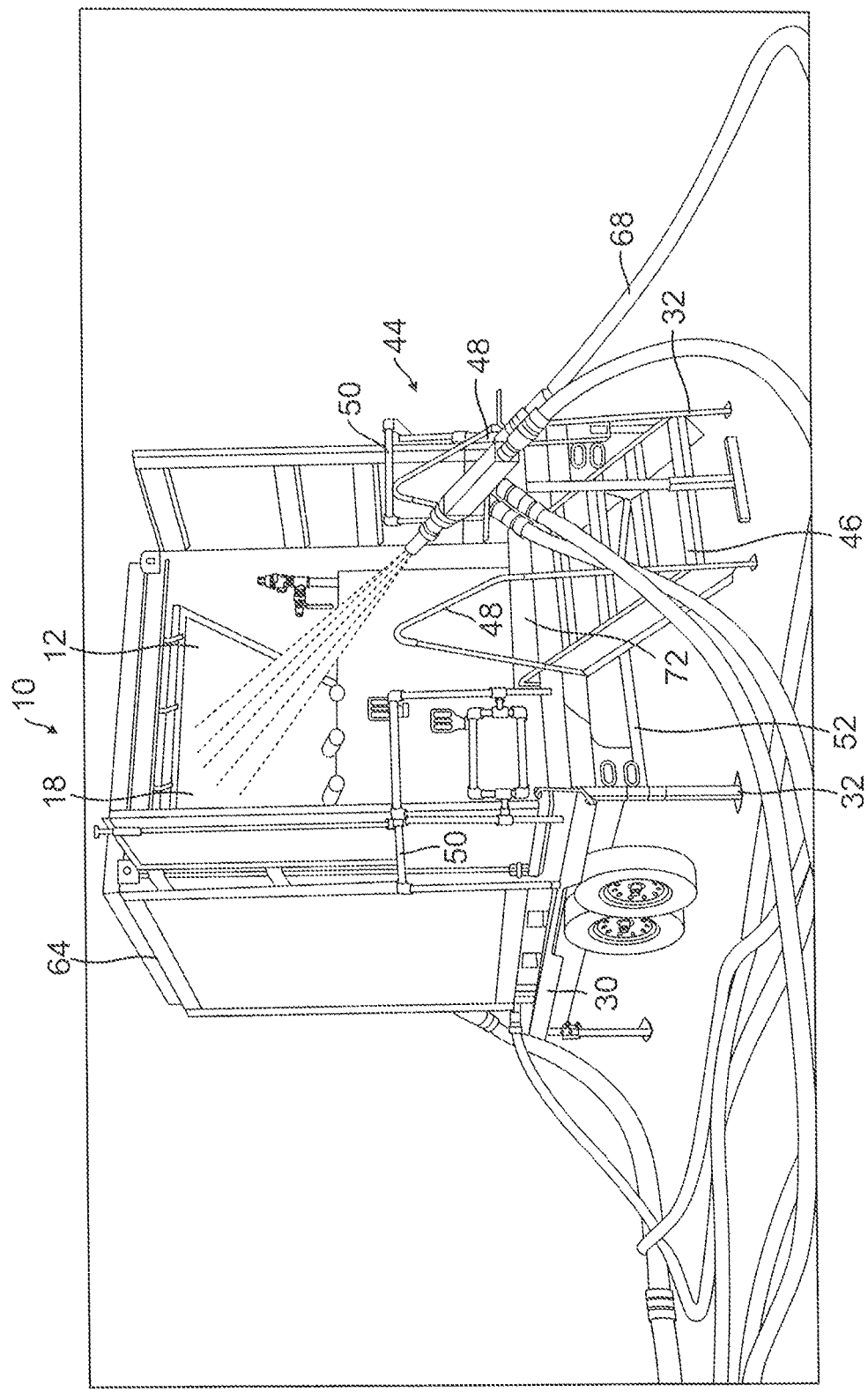
FIG. 9 is a rear view of the apparatus of the instant invention showing the retaining wall of the cistern, the diffuser screen, the static hose ports, the retractable stairs, the on-board suction hose storage, the safety hand rails and a variety of hose connections used for fire engineer/candidate training and pump and appliance testing with an example of a hose being used for training.
Figure 10:
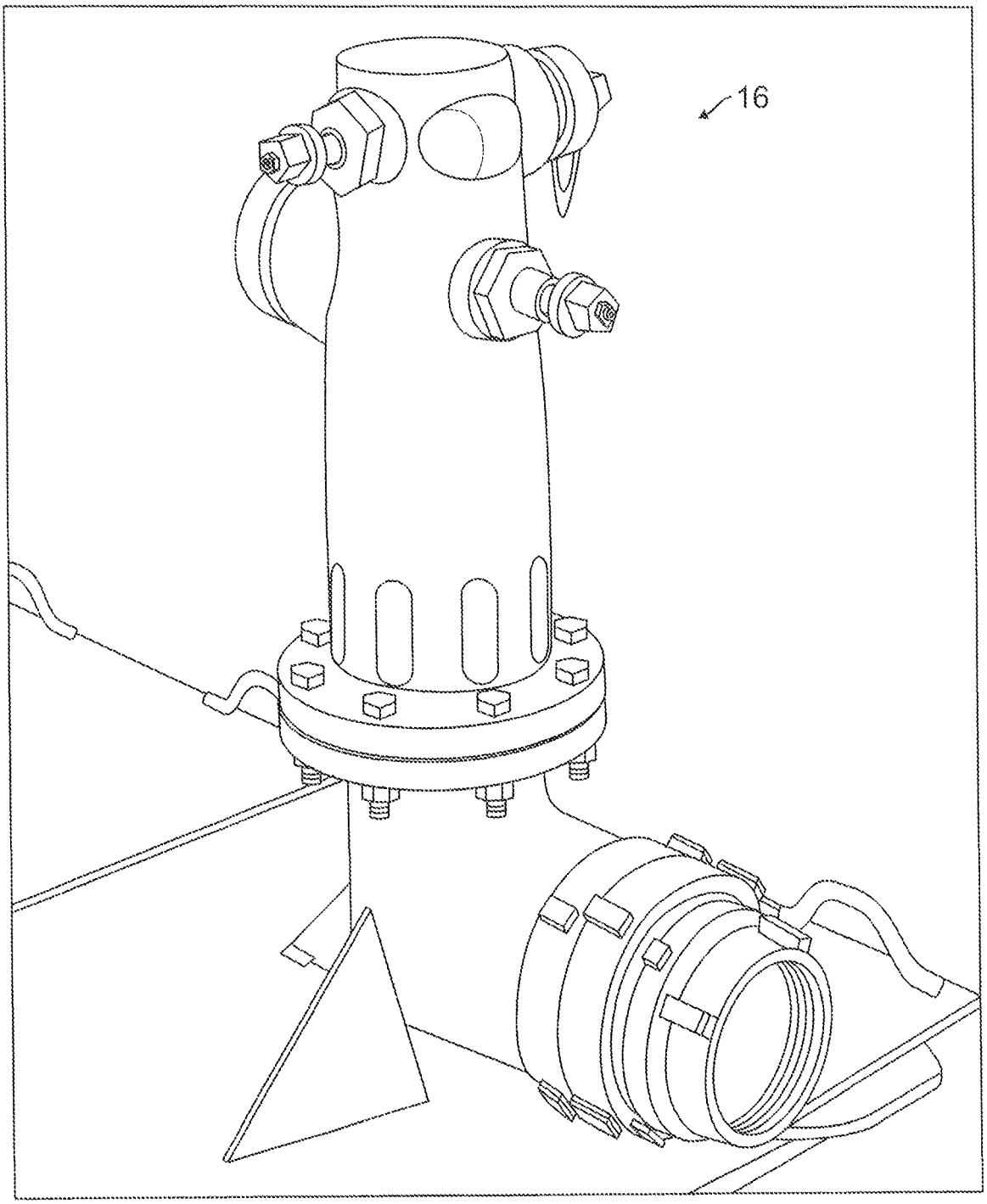
FIG. 10 is a perspective view of the portable training hydrant appliance that is a portion of the apparatus of the instant invention.

The apparatus 10 of the instant invention incorporates a fire department connection ("FDC") 68 not unlike on training towers or other prior art. Where the apparatus 10 of the instant invention differs from prior art is in the incorporation of the resistance and friction loss coil system 22 and a safety feature known as a pressure relief valve ("PRV") 24. The addition of these innovations improves the overall safety of the apparatus 10 of the instant invention, which allows for engineers and candidates to apply various pressures and flow rates to the system in safety. (See FIG. 8.)

Figure 6:
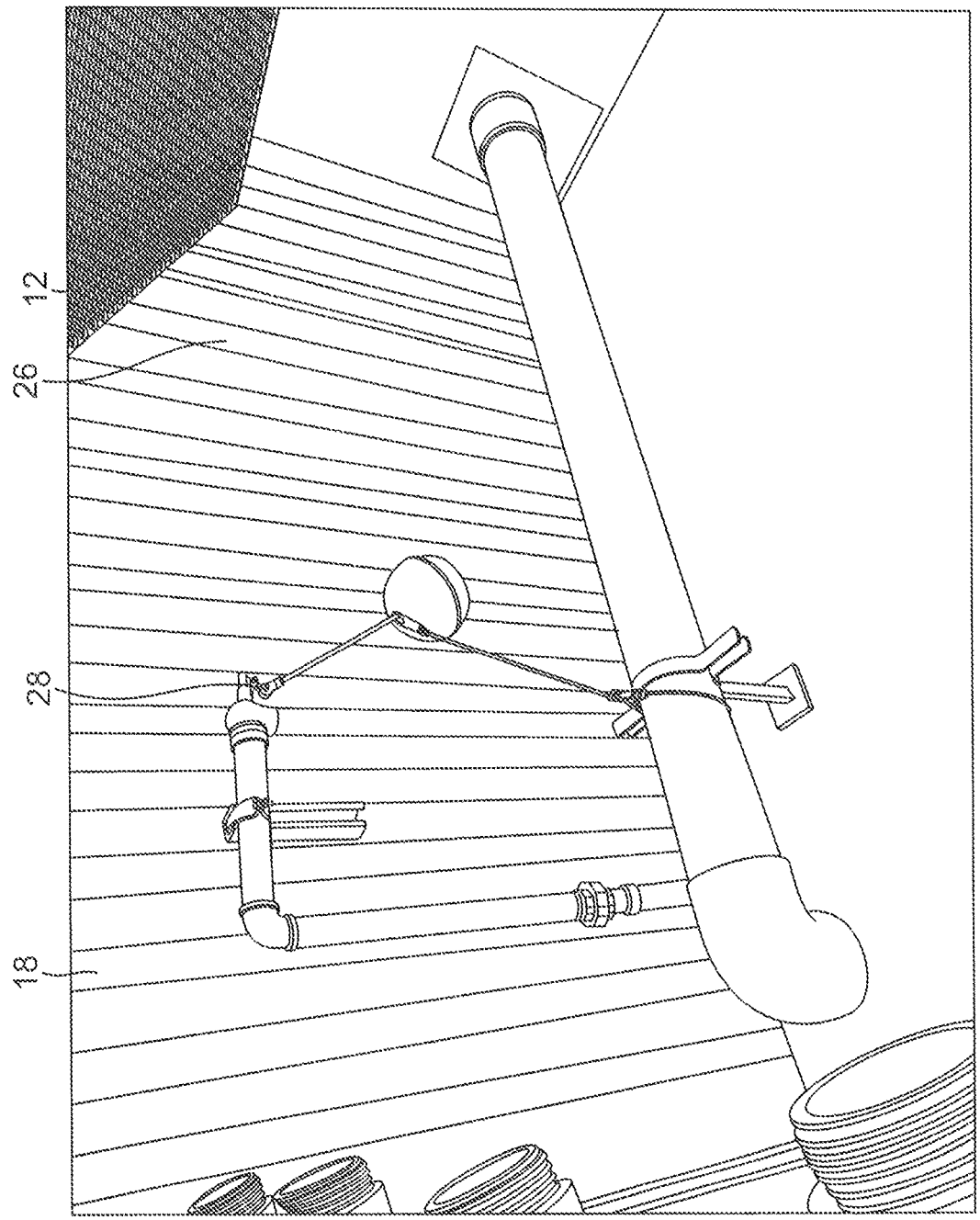
FIG. 6 is a view inside the cistern portion of the instant invention featuring the drafting suction line as well as the water fill line with the associated fill valve that maintains a safe fluid level while in operation.

Getting water/fluid into the apparatus 10 of the instant invention incorporates a separate fill line 26, which is not associated with any other function of the apparatus 10. This fluid fill line incorporates a float ball valve assembly to maximize efficiencies. Operating the apparatus 10 of the instant invention with the fluid fill line 26 charged allows for continuous full-flow training evolutions and testing as the fluid fill line 26 will maintain the fluid level in the cistern 18 at a "full" level at all times. It automatically refills itself not unlike a toilet tank. A built-in sprinkler/stand pipe system 60 is incorporated into the cistern 18 and is connected to the FDC 68. (See FIG. 6.)

The fire sprinkler system 60 incorporates the PRV 24 and the resistance coil 22. (See FIG. 8.) The resistance coil 22 is a literal coil of pipe and fittings which imposes friction and resistance on the fluids giving the pump and the personnel the same amount of resistance experienced equivalent to 150' of sprinkler line and/or 3 stories of elevation. This sprinkler/stand pipe system 60 is utilized in conjunction with the FDC 68 and is utilized to train and practice for when an actual fire sprinkler system or stand pipe is activated and the fire apparatus/engine is employed to supplement the pressure and volume of fluids required to maintain the firefight. The apparatus 10 of the instant invention is allowing the engineers/candidates to run hand lines to the apparatus 10 and make hose line attachments to the PDC 68 and exercise the sprinkler/stand pipe system 60 and all the associated appliances at full-flow and various pressures with input from the trainers as desired to challenge the engineers/candidates with real-life situations/problems, including seeing a vast pressure drop and the performing of the requisite corrective actions in order to maintain fluid flows.

The mobile base 30 of the apparatus 10 of the instant invention employs four (4) heavy-duty stabilizer jacks 32, one on each of the four corners 34 of the mobile base 30 perimeter 36 in addition to the heavy-duty tongue jack 40. The mobile base 30 is designed to support operations on both the front end 42 and the rear end 44 of the apparatus 10 separately and/or simultaneously. At the rear end 44 of the apparatus 10 there is a folding access stair 46 with safety rails 48 for rear deck 72. The rear deck also employs safety railing 50. Under the rear deck 72 on either side of the folding stair 46 are the integral storage tubes 52 for the suction hoses.

On the front deck 42 of the apparatus 10 of the instant invention is positioned an on-board storage locker 54 positioned adjacent to the drafting riser assembly 56. (See FIGS. 1, 2, 5.) This drafting riser assembly 56 makes it possible to train with personnel and apparatuses on a variety of specific engineer/candidate training tasks as well as pump test evolutions.

The drafting riser assembly 56 is a specific training element for drafting. Drafting is where fire departments are required to be able to access and pump water from still water sources such as a swimming pool for use in a fire fight. The draft riser assembly provides the same amount of work for a pump to meet and exceed the NFPA pump test requirements as well as for training engineers/candidates to perform the task as a portion of their training evolutions. Per the NFPA, a fire apparatus must be able to lift a 4" column of water 10' into the pump to affect a minimal draft. The draft riser assembly on the apparatus 10 of the instant invention is plumbed with 6" pipe and a 6' lift which roughly equates to the 4" lift of 10'. The fire apparatus 70 installs a hard suction between their pump intake and the draft riser assembly 56 where the fire pump 70 will employ its primer pump to establish the requisite lift to establish the status of a good draft. The draft riser assembly 56 is equipped with a variety if valves and bleeders that allow the engineers/candidates to train and breakdown their hoses post training.

The front end 42 of the apparatus 10 of the instant invention includes a secondary drafting line for the instances where additional water/fluid flow is required and surpasses the ability of the draft riser assembly 56 to provide.

Figure 7:
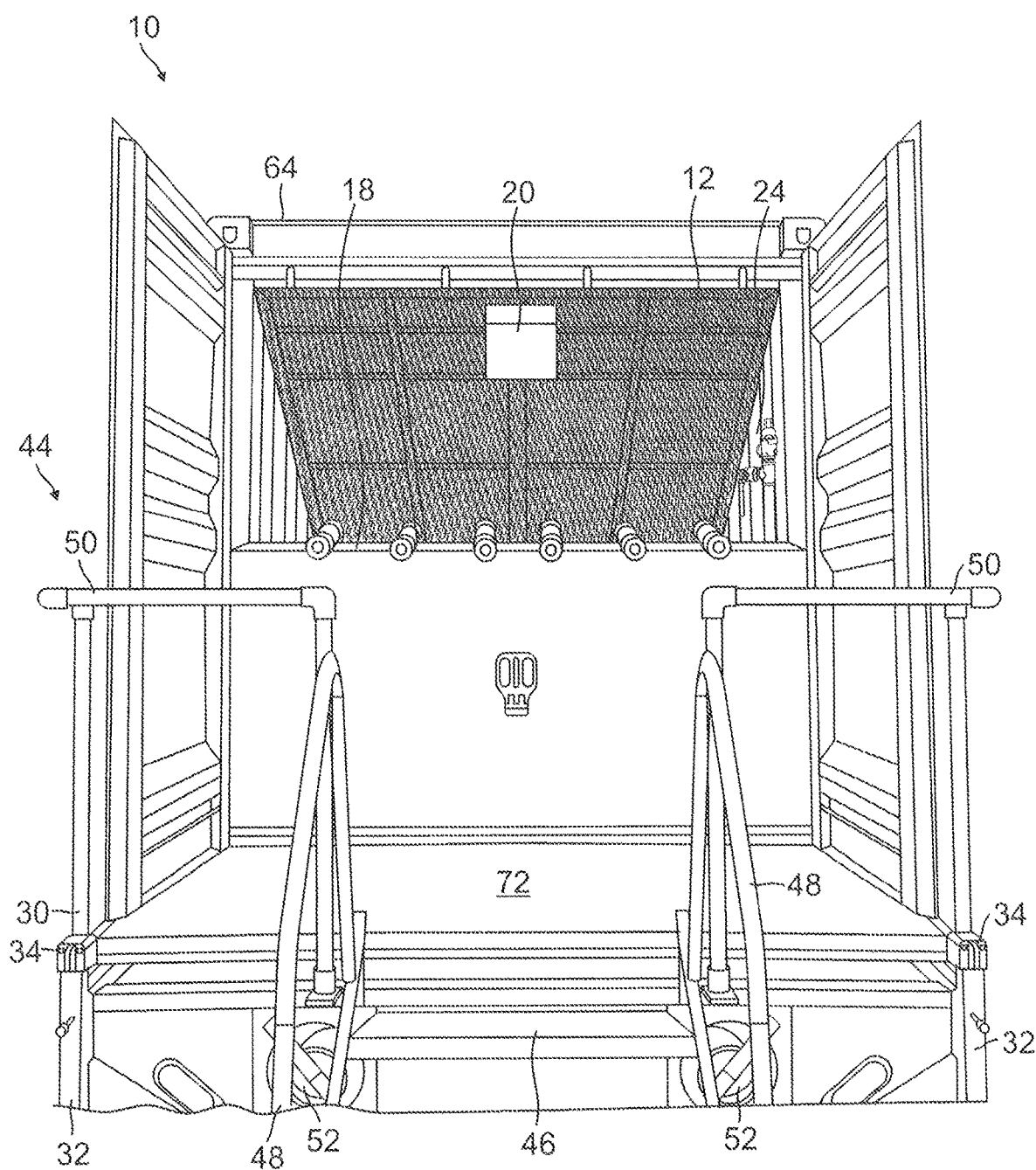
FIG. 7 is a rear view into the cistern portion of the instant invention showing the diffuser portion of the apparatus which provides for the prevention of heat accumulation of the active fluids and prevents overheating of the liquid therein.

Another important feature of the apparatus 10 of the instant invention involves the ability to flow water/fluid continuously whilst cooling the water to prevent overheating. This passive cooling accomplished by the use of the internal diffuser 12 inside the cistern 18 area. (See FIG. 7.) The internal diffuser acts as an angled diffuser/deflector inside of the cistern 18. The installation is made at an engineered angle, it is metallic in nature and acts much like a grate or a strainer that is made up of a plurality of apertures at intervals that diffuse the water/fluid into droplets which allows for and encourages the passive cooling to the water/fluids as they are returned to the cistern 18. When friction and pressure are applied to water/fluids, basic laws of physics require heat to build as a side effect. Thus, when fire apparatuses pump water/fluids, they inherently heat the water/fluid. By recirculating water/fluid in a closed loop environment it is inevitable that the water/fluid will overheat as is demonstrated by the prior art and why they do not work without constantly stopping operations to dump the hot water/fluid and replenish with fresh cold water/fluid.

The invention disclosed herein suitably may be practiced in the absence of any element which is not specifically disclosed herein.

The discussion disclosed in this patent is intended to serve as a basic description. The reader should be aware that the specific discussion may not explicitly describe all embodiments possible, and the alternatives are implicit. Also, this discussion may not fully explain the generic nature of the invention and may not explicitly show how each element can actually be representative or equivalent elements. Again, these are implicitly included in this disclosure. Where the device is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each variation, be it a variation of any apparatus embodiment, a method embodiment, or even merely, a variation of any element of these. Particularly, it should be understood as the disclosure relates to elements of the invention, the words for each element may be expressed by equivalent apparatus terms even if only the function or the result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action that the physical element facilitates. Such changes and alternative terms are to be understood to be explicitly included in the description.

What is claimed is:

1. A mobile system and apparatus for training of firefighter personnel that recirculates water/fluids for continuous use without overheating said water/fluids, said system and apparatus comprising:
   a mobile base that is attachable via a hitch to a larger vehicle for towing;
   a cistern situated on top of said mobile base for the collection, containment and recirculation of said water/fluids, said cistern further comprising:
   an outer wall;
   a roof;
   an interior space formed between said base, said outer wall and said roof into which said water/fluids are collected, contained and/or recirculated; and
   a target on said roof, said target being visible from above said apparatus and further comprising a plurality of apertures that allow for the diffusion of heat generated through the circulation of said water/fluids;
   wherein a portable fire hydrant is attached to said mobile base, said portable fire hydrant being secured thereon with a pin.

2. The mobile system and apparatus as defined in claim 1 wherein said cistern includes an openable door to said interior space wherein when said openable door is opened, the target is revealed as a hanging target for the aiming of water/fluids thereon.

3. The mobile system and apparatus as defined in claim 1 wherein inside of said interior space of said cistern is an automatic shut off valve that closes when a specific water/fluid level is reached inside of said interior space of said cistern.

4. The mobile system and apparatus as defined in claim 1 wherein inside of said interior space of said cistern is a resistance coil and a pressure relief valve.

5. The mobile system and apparatus as defined in claim 1 wherein a drafting riser assembly is affixed to said mobile base, said drafting riser assembly further comprising:
   a pipe with a diameter of six inches and a lift that is six feet into which a hard suction is installed via connection with a fire engine apparatus.

* * * * *